No. 641,718. Patented Jan. 23, 1900.
W. W. MILLER.
GRAIN DRILL.
(Application filed Mar. 1, 1899.)
(No Model.) 6 Sheets—Sheet 1.

Witnesses Wilson W. Miller Inventor
By his Attorneys.

No. 641,718. Patented Jan. 23, 1900.
W. W. MILLER.
GRAIN DRILL.
(Application filed Mar. 1, 1899.)
(No Model.) 6 Sheets—Sheet 5.

Witnesses
Jas. K. McCathran
[signature]

Wilson W. Miller Inventor
By his Attorneys,
C. A. Snow & Co.

UNITED STATES PATENT OFFICE.

WILSON W. MILLER, OF SAXMAN, KANSAS.

GRAIN-DRILL.

SPECIFICATION forming part of Letters Patent No. 641,718, dated January 23, 1900.

Application filed March 1, 1899. Serial No. 707,379. (No model.)

*To all whom it may concern:*

Be it known that I, WILSON W. MILLER, a citizen of the United States, residing at Saxman, in the county of Rice and State of Kansas, have invented a new and useful Grain-Drill, of which the following is a specification.

My invention relates to grain-drills to sow wheat or grain in fields where corn is planted in the springtime and where it is desired to sow wheat in the fall of the year. It is customary to sow wheat in the intervals between the corn-rows, on each side of each corn-row, thus leaving a space of from ten to fifteen inches where the wheat is not sown or distributed; but in my improved drill the wheat is sown and distributed broadcast directly in and over the space where the corn stands, after which the wheat is covered. Special importance is attached to the provision of means by which the grain is distributed and sown over and upon the rows of corn, because by such devices I am enabled to utilize all the available space in the field and attain an increased yield of wheat per acre as compared with the results obtained by the use of that class of machines in which the grain is sown only in the spaces between the rows.

The primary object of the invention is, therefore, to provide a grain-drill having means for sowing grain in the spaces or intervals between corn-rows and additional means for sowing or distributing the grain broadcast directly over the corn-rows, thereby depositing the grain over the entire area of the field traversed by the machine, whereby there are no open spaces left in the field where the corn previously stood in rows, and weeds cannot spring up to sap the ground in such vacant spaces.

A further purpose of the invention is to provide means by which the penetration of the drill-hoes and the depth of deposit of the grain may be regulated or the machine may be thrown out of operative position; and such regulating and controlling devices require minimum effort on the part of the attendant and are all located within easy reach.

A further object of the invention is to provide means by which the drill hoes or tubes may be adjusted to regulate the spaces or intervals between said hoes or tubes, and this adjusting mechanism is so mounted and arranged as to be operative independently of the means for raising or lowering the drill-hoes.

A further object of the invention is to simplify and improve the construction in minor details, so as to reduce the weight of the parts without sacrificing the strength, and to promote the efficiency of operation and the facility of adjustment.

With these ends in view the invention consists in the novel combinations of elements and in the construction and arrangement of parts, which will be hereinafter fully described and claimed.

To enable others to understand the invention, I have illustrated a preferred embodiment thereof in the accompanying drawings, forming a part of this specification, and in which—

Like numerals of reference denote like and corresponding parts in each of the several figures of the drawings.

In carrying my invention into practice I provide two parallel frames arranged one above the other and adjustably connected together for the upper frame to be adjusted relatively to the lower frame by manually-operative contrivances, and the upper frame carries the hopper, the drill-hoes, and the parts coacting therewith, while the lower frame sustains all of the working parts of the machine and is equipped with means to regulate its height above the ground and the penetration of the drill-hoes. For the purpose of distinguishing these frames one from the other I will hereinafter designate the lower frame 20 as the "main" carrying-frame, while the upper frame 21 will be termed the "hoe-frame," and in this connection I desire to state that each of these frames is skeletonized and made of metal to reduce the weight as much as possible without sacrificing the strength and durability. The two frames 20 21 are slotted longitudinally for the accommodation of the main carrying or ground wheel 22, and for the support of this ground-wheel the hoe-frame 21 is equipped with shaft-bearings 23, that are secured firmly to the side bars of the skeleton hoe-frame and are arranged in line with each other to receive the axle 24 of the ground-wheel 22, said axle having a sprocket-pinion 25, designed to actuate an endless sprocket-chain 94 for driving the seed-wheel shaft 89 of the force-feed mechanism 87ª, (see Fig. 21,) which constitutes a part of the drill, as will hereinafter appear.

Figures 6, 10, 11, 16:
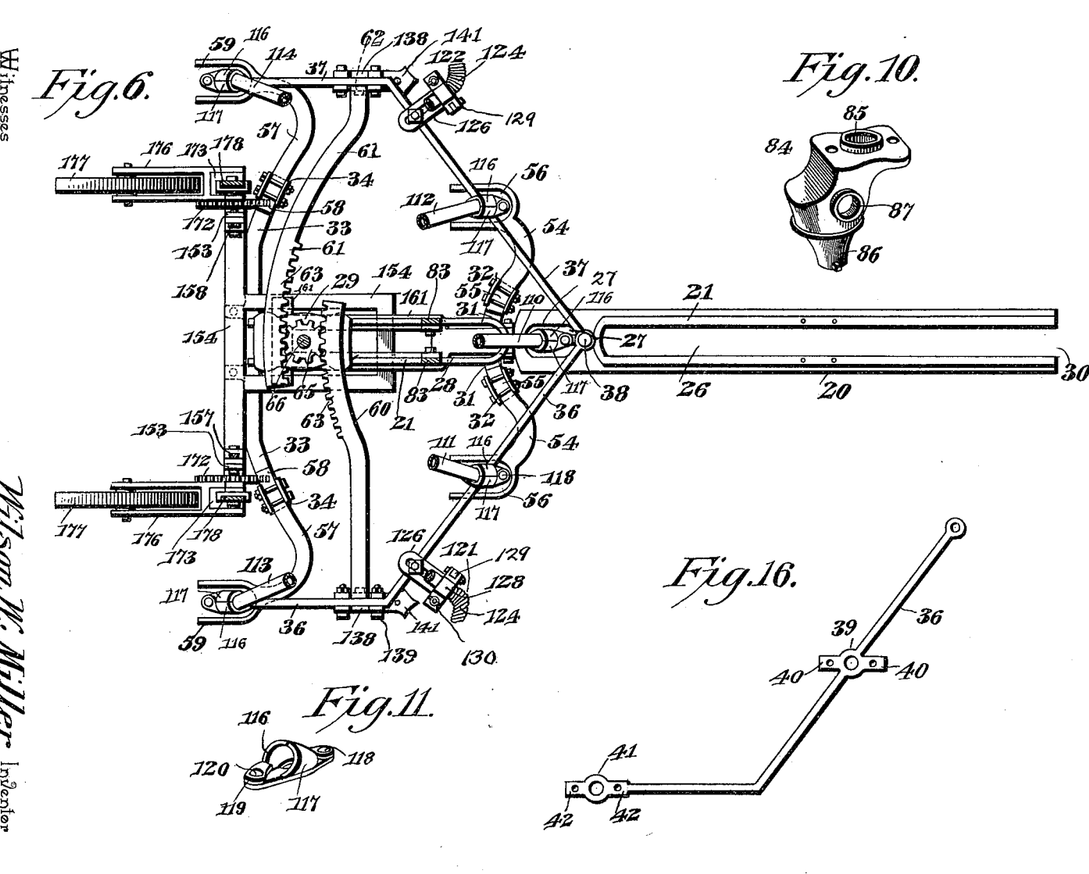
Fig. 6 is a horizontal sectional plan view on a plane above the hoe-carrying frame and on the line 6 6 of Fig. 1.
Fig. 10 is an enlarged detail view of one of the seed-cups.
Fig. 11 is a detail perspective view of one of the two-part clamps for the swiveled conveying-tube between one of the seed-cups and one of the hoe-tubes.
Fig. 16 is a detail plan view of one of the adjustable side members of the hoe-frame of the machine shown by Figs. 1 to 6, inclusive.

The hoe-frame 21 (see Fig. 6) is made of a single piece of metal, either of malleable iron or cast-steel, and said frame has the longitudinal slot 26 at its front end for the reception of the ground-wheel, a vertical eye 27 being at a point intermediate of its length and arranged to have the central hoe or drill-tube of the machine aline therewith. It is skeletonized or slotted, as at 28, in rear of the eye 27, and its rear extremity is made solid to provide a horizontal flat guide-plate 29, which receives the adjusting-bars 60 61, by which the movable members of the hoe-frame may be expanded or contracted with relation to the hoe-frame proper, 21. The main carrying-frame 20 is also made or formed of a single piece of metal, and at its front part it is skeletonized or slotted, as at 30. It is provided at a point intermediate of its length with a pair of short curved arms 31, which project from opposite edges of said main frame directly in rear of the slot 30 thereof. It is furthermore provided with a pair of longer arms 33, which are curved and project from opposite sides of said main frame at the rear extremity thereof, and, finally, the rear widened end of the frame 20 is provided with the projecting flanges 35, which provide for the convenient attachment of the transverse supporting-bar, that may be said to form a part of the main carrying-frame, although said bar is made separate from the frame proper and is secured firmly thereto, as will hereinafter appear. The short curved arms 31 of the frame 20 are grooved or flanged to provide the guideways which slidably receive the cleaner-slides 54, that serve to scrape the intermediate drill hoes or tubes, which are carried by the adjustable side members of the hoe-frame, and in like manner the long arms 33 of the main frame are flanged or grooved to provide the guideways 34, which receive and confine the scraper-slides 57 for the rear drill hoes or tubes, the latter also being carried by the adjustable side members of the hoe-frame, whereby the arms 31 33 of the main carrying-frame support the cleaner-slides in a manner to scrape the drill hoes or tubes and at the same time permit the slides to move with the drill-hoes when the latter are adjusted by the movement of the side members of the hoe-frame.

The adjustable side members of the hoe-frame are indicated by the numerals 36 37, and each member is a single piece of metal in the form of an irregular-shaped bar or rod. (See Figs. 6 and 16.) One member, 36, of the hoe-frame is arranged on one side of the frame proper, 21, while the other member, 37, is disposed on the opposite side of the hoe-frame 21, and these two members 36 37 are pivotally connected to the frame 21 by a common pivot-bolt 38, which passes through the contiguous forward ends of the members 36 37 and through the frame 21 at a point in advance of the eye 27, with which alines the central drill hoe or tube 43. Each member 36 or 37 of the hoe-frame is provided at a point intermediate of its length with an eye 39, which is flanged, as at 40, and at or near its rear end each adjustable member 36 or 37 is furthermore provided with an eye 41, which is flanged, as at 42. It will be observed that provision is made on the hoe-frame and its adjustable side members for the reception of five drill hoes or tubes, because the frame member 21 has an eye to receive one drill-hoe, while each side member has two eyes properly spaced apart for the accommodation of a like number of drill-hoes. The central drill-hoe is indicated at 43, and it is fitted to the frame 21 in line with the eye 27 of the hoe-frame 21. The intermediate drill-hoes are indicated at 44 45, and their upper ends are fitted to the eyes 39 of the side members 36 37. The rear drill-hoes are designated by the numerals 46 47 as being fitted to the eyes 41 of the side members of the hoe-frame. The intermediate hoes 44 45 are arranged in the same transverse plane, and they lie in rear and on opposite sides of the plane of the central drill-hoe 43. The rear hoes 46 47 lie in positions on opposite sides of the intermediate hoes 44 45 and at a proper distance in rear of the same, and all of the hoes are thus disposed in staggered relation in order to properly drill the grain in the ground. Each hoe or tube of the machine is cast in a single piece of metal with a flange 48 on the front upper side thereof and with a flange 49 on the rear upper side. The drill-hoe is permanently connected by a pivot-joint with the hoe-frame or one of its members by a metallic pivotal bolt 50, which passes through the rear flange 49 thereof and one of the flanges on the hoe-frame or a member thereof, to which the drill-hoe is fitted, while the front flange 48 of each drill-hoe is connected detachably to the drill-frame or a part thereof by a breakable pin 51, preferably of wood. It will be understood that each intermediate hoe 44 or 45 is connected by the pivotal bolt and the breakable pin with the flange 40 of one eye on an adjustable side member of the hoe-frame, and that in like manner each rear drill-hoe 46 or 47 is connected by the pivotal bolt and breakable pin with the flange 42 of an eye 41 (see Fig. 16) in one side member or the other of the hoe-frame. Each drill-hoe is thus connected with the hoe-frame or a part thereof in a manner to be held properly in place under normal conditions of service of the machine; but should the hoe or tube strike an obstruction, such as a root or stone, the frangible pin 51 will be broken and the hoe permitted to swing on its pivotal bolt 50 in an upward and rearward direction, thereby overcoming injury to the drill-hoe itself or the frame to which it is connected.

Each hoe or tube of the drill has its lower end reinforced by a metallic point 52, which is made separate from the hoe for application to its front face at the lower end thereof, and each point is bolted securely to the hoe by the bolt 53.

Figures 4, 7, 14:
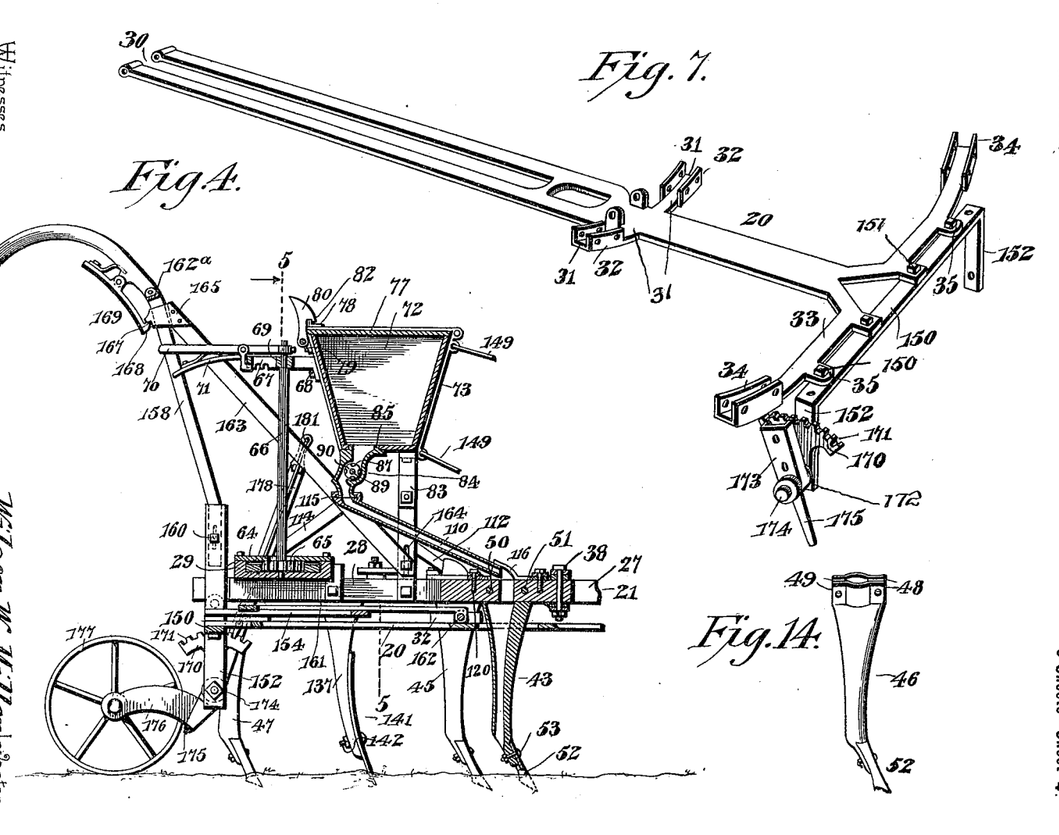
Fig. 4 is a vertical longitudinal sectional elevation on the plane indicated by the dotted line 4 4 of Fig. 2.
Fig. 7 is a detail perspective view of the main carrying-frame, with the fixed transverse bar of the rear end thereof, and illustrating the parts associated with said frame.
Fig. 14 is a perspective view of one of the drill hoes or tubes.

To clean the intermediate hoes or tubes 44 45, I provide the adjustable slides 54, which are properly engaged with the hoes and are slidably fitted to the arms 31 of the hoe-frame 21. Each cleaner-slide 54 (see Figs. 6 and 7) is provided with a shank 55, curved or shaped to fit in the guideway 32 of the arm 31, and each slide 54 has its other end forked, as at 56, to enable it to properly embrace one or the other of the hoes 44 or 45. In like manner the rear drill-hoes 46 47 are scraped and cleaned individually by the rear slides 57, that are properly connected to the rear hoes and to the arms 33 of the hoe-frame. Each rear slide is cast in a single piece of metal with a shank 58 and a fork 59, and the shank is arranged snugly in the guideway of the arm 33, while the fork fits around the hoe 46 or 47.

To adjust the side members 36 37 of the hoe-frame, and thereby vary the distance between the tubes or hoes 44 and 45 or the hoes 46 and 47, I provide the adjusting-bars 60 61. The outer ends of these adjusting-bars are attached at 62 to the frame members 36 37 at points intermediate of the length thereof, and the adjacent inner ends of these adjusting-bars 60 61 are arc-shaped and provided with gear-teeth, as at 63. The teeth are on the opposing edges of the contiguous ends of said adjusting-bars, and the latter are slidably fitted to a flanged and notched guide-plate 29 at the solid rear extremity of the hoe-frame. Said inner ends of the adjusting-bars are confined in place on the guide-plate 29 by means of a guide-plate 64, which is arranged upon and fastened detachably to the guide-plate 29 in any approved way. The plates 29 64 are parallel to each other to hold the inner ends of the bars 60 61 in proper relation, and the flanges of the plate 29 are notched for the ends of the bars 60 61 to pass therethrough. Between the plates 29 64 is arranged an adjusting gear-pinion 65, that is interposed between the toothed edges of the bars 60 61 to mesh directly therewith, and this gear-pinion when moved in one direction will actuate the adjusting-bars 60 61 to move the latter outwardly in opposite directions simultaneously for the purpose of uniformly expanding the frame members 36 37 of the hoe-frame; but a reverse rotation of the adjusting-pinion 65 will draw the adjusting-bars inwardly and impart a like adjustment to the hoe-frame members. It will thus be seen that the hoe-frame members may be adjusted simultaneously to vary the distance between the drill-hoes which lie upon opposite sides of the median line of the hoe-frame 21 and the central drill-hoe 43, and in this adjustment of the frame members and the central and end drill-hoes the adjustable slides 54 57 will travel with the hoes in order to maintain the connection between the latter and the main carrying-frame, for the purpose of cleaning said hoes. The pinion 65 may be operated conveniently by the driver through the medium of a vertical shaft 66, the lower end of which is supported in the plates 29 64 and is fastened to the pinion 65 for the latter to turn with said shaft. A segment 67 is bolted firmly at 68 to the grain-hopper, and this segment has a central bearing 69 formed or cast as a part thereof. The segment is attached to the hopper for the bearing 69 to lie in the vertical plane of the bearing in the plates 29 64, which receives the lower end of the shaft 66, whereby the bearing 69 of the segment is adapted to receive the upper part of the shaft 66. The shaft is equipped with an operating-handle 70, on which is mounted a locking-dog 71, that is adapted to traverse the edge or face of the segment 67 and to engage with one or the other of the series of notches in said segment, whereby the locking-dog may confine the shaft 66 and the lever or handle 70 at any point of its adjustment.

The grain to be drilled is carried in a transverse hopper 72, which is supported in an elevated position on the hoe-frame 21, and in the detailed construction of this hopper I employ the cast-metal end plates 73, which are flanged to receive side and bottom boards that are firmly united to the end plates and which form, in connection with said end plates, a firm and substantial construction of hopper. The end plates are cast with hinge-lugs 74, to which are pivotally connected the hinge-bars 75 by means of the pintle 76, and to these hinge-bars is firmly secured the top 77 of the hopper. This top or cover for the hopper is provided with a catch-plate 78, and on the hopper is fastened a hinge-plate 79, the upper end of which is forked to receive the latch 80, which is pivotally attached, as at 81, to said plates 79. The latch 80 is provided with a lip 82, (see Fig. 1,) that is arranged to engage with the catch-plate 78, and by the provision of this latch the cover or top to the hopper may be held closed securely to prevent the loss of grain and the admission of dirt. This transverse hopper 72 is supported on the hoe-frame by means of uprights or standards 83, which are attached in a secure manner to the hopper and to the hoe-frame, whereby the hopper and the drill-hoes are mounted on the same frame for movement therewith in order to maintain said parts in the same relation one to the other under all adjustments of the hoe-frame. This hopper is equipped with a series of seed-cups, which correspond in number to the number of drill hoes or tubes and to the conducting-tubes for broadcast sowing, to be hereinafter described, and these seed-cups are connected individually to the drill-hoes and to the conducting-tubes for broadcast sowing by devices which permit the drill-hoes and said conducting-tubes to be adjusted laterally with respect to the hoe-frame 21 without breaking or interrupting the communication from the seed-cups to said hoes and the tubes for broadcast sowing. It is common in the art to make the seed-cups each in a number of pieces, which are assembled together and are united in divers ways; but such sectional construction is objectionable because the parts are liable to work loose and become separated, thus permitting the grain to escape from the seed-cup. I overcome this objection by casting each seed-cup in a single piece of metal, (see Fig. 10,) and the seed-cup is constructed for application firmly to the hopper and to enable the conveying-tube to be united by a swiveled coupling to the seed-cup. Each seed-cup is provided at its upper end with a flange 85, that is adapted to be secured firmly to the hopper so as to communicate with the grain-chamber therein, and at its lower end the seed-cup has a nozzle 86, to which is fitted the flared and flanged upper end of a conveying-tube, which may be carried to one of the drill-hoes or to a broadcast sower. Each seed-cup is, furthermore, provided with a transverse opening, adapted to accommodate the force-feed seed-wheel, and the cup is, furthermore, provided with a longitudinal grain-passage, which intersects the transverse opening 87 and communicates with the flange 85 and the nozzle 86 to insure the passage of grain through the seed-cup. The series of seed-cups are attached to the hopper in corresponding positions for the transverse openings 87 therein to lie in the same horizontal plane and to be in alinement with each other, and through these openings of the seed-cups extends the force-feed shaft 89, that is adapted to rotate within the seed-cups and is capable of a limited endwise adjustment therein. This shaft carries a series of force-feed seed-wheels 90, (see Fig. 21,) which are attached to the shaft 89 to rotate and to move endwise therewith, and each seed-wheel has a corrugated length 91 and a smooth length 92. The seed-wheels have the corrugated lengths 91 thereof contained either partially or wholly in the transverse openings 87 of the seed-cups for the purpose of regulating the quantity of seed or grain which may be forced through the cup when the shaft is rotated; but to vary the quantity of grain which may be discharged from the hopper the shaft 89 may be moved endwise a limited distance to adjust all the seed-wheels, whereby each seed-wheel may have a part of its smooth length 92 extended into the opening 87 of the seed-cup and the area of the corrugated length 91 of the seed-wheel contained within the seed-cup is reduced. The shaft 89 is driven by a sprocket-pinion 93 and a sprocket-chain 94, the latter being operatively connected to the pinion 25 on the ground-wheel shaft 24. The driven sprocket 93 is loose on the shaft 89, and this pinion is prevented from displacement in one direction on the shaft by a stop-collar 95, which is fitted to the shaft. The driven sprocket 93 is provided with a clutch-face 97, with which is adapted to engage a slidable clutch 98, that is keyed or splined, as at 99, to the shaft 89. The clutch is thus attached to the shaft to rotate therewith, and when the clutch is engaged with the driven sprocket 93 the latter is made fast with the shaft for the purpose of rotating the same. The clutch may be adjusted on the shaft into or out of engagement with the driven sprocket through the medium of a shipping-lever 100, which is fulcrumed at 101 to the fixed hopper-plate 96, and when the clutch is engaged with the driven sprocket it is prevented from working loose by means of a locking-lever 102, which engages with the shipping-lever 100. This locking-lever has an angular arm 103, and it is fulcrumed at 104 on the plate 96. A spring 105 is attached to the plate in a position to engage with the angular arm 103 of the shipping-lever, and this spring forces the lever normally to a position where the shoulder or nib 106 engages with the free end of the shipping-lever. In order to release the clutch from engagement with the driven sprocket, and thereby throw the shaft 89 out of gear, it is necessary to adjust the locking-lever 102 against the tension of its spring 105 for disengaging the shoulder or nib 106 of the shipping-lever; but when the machine is in service the lever 100 is firmly locked in place by the lever 102.

As is usual in machines of this class an indicator-lever 107 (see Figs. 3 and 5) is arranged to traverse a graduated scale on a dial-plate 108, which is attached to the hopper and which serves to indicate the quantity of grain which is forced from the hopper by the action of the force-feed mechanism. This lever 107 has a forked end which engages with a collar 109 on the shaft 89, and any endwise adjustment of the shaft will actuate the lever 107 to change its position relatively to the scale on the dial-plate. In this connection it is to be observed that the lever 107 not only forms a part of the indicating device, but also constitutes the adjusting-lever, which is moved in either direction by hand when it is desired to adjust the shaft 89 longitudinally to change the positions of the seed-wheels 90.

As hereinbefore indicated, my machine is constructed with a series of five drill hoes or tubes, and it is, furthermore, equipped with two conducting-tubes for broadcast sowing, one of which is provided on each side of the machine, thereby making the machine embody or contain seven devices by which the grain may be distributed. I employ a series of seed-cups which correspond in number to the aggregate number of seed drilling and distributing devices—i. e., the drill-hoes and the broadcast sowers—and these seed-cups are connected individually to the distributing or sowing devices. For the purpose of conveniently distinguishing the seed-cups one from the other in their relation to the sowing and distributing devices I have indicated the seed-cups by the reference-letters $a\ b\ c\ d\ e\ f\ g$, and this designation is adopted for the purpose of distinguishing the cups in their relation to the means by which the grain is carried to the drill-hoes and broadcast-sowing tubes. The central cup $a$ of the series of seed-cups 84 is connected by a conveying-tube 110 to the central drill hoe or tube 43, which is in line with the eye 27 of the hoe-frame. The next two seed-cups $b\ c$ of the series of seed-cups 84 are connected individually by the tubes 111 112 to the intermediate hoes 44 45, which are fitted to the eyes 39 of the adjustable frame members 36 37. The two end seed-cups $f\ g$ of the series of seed-cups 84 are connected by the conveying-tubes 113 114 to the rear drill-hoes 46 47, which are fitted to the eyes 41 on the adjustable members 36 37 of the hoe-frame. The employment of the series of five conveying-tubes thus provides for the individual connection of the seed-cups to the drill-hoes, and there are two of the seed-cups remaining unconnected—i. e., the cups designated as $d\ e$, which lie next to the end cups $f$ and $g$. These unconnected seed-cups $d\ e$ are designed to supply the grain to the broadcast sowers in the preferred arrangement of the operating parts of my grain-drill. This disposition and connection of the seed-cups to the drill-hoes by means of the conveying-tubes is adopted because the conveying-tubes can be led from the cups to the drill-hoes without getting in the way one of the other; but I do not strictly confine myself to this particular adaptation or disposition of the several parts, because I am aware that the broadcast-sowing tubes may be connected operatively with any two seed-cups of the series of cups 84 without departing from the invention, in which event the conveying-tubes for the drill-hoes will be properly disposed and connected in a manner which will be readily suggested by a skilled mechanic.

Figures 2, 12, 13:
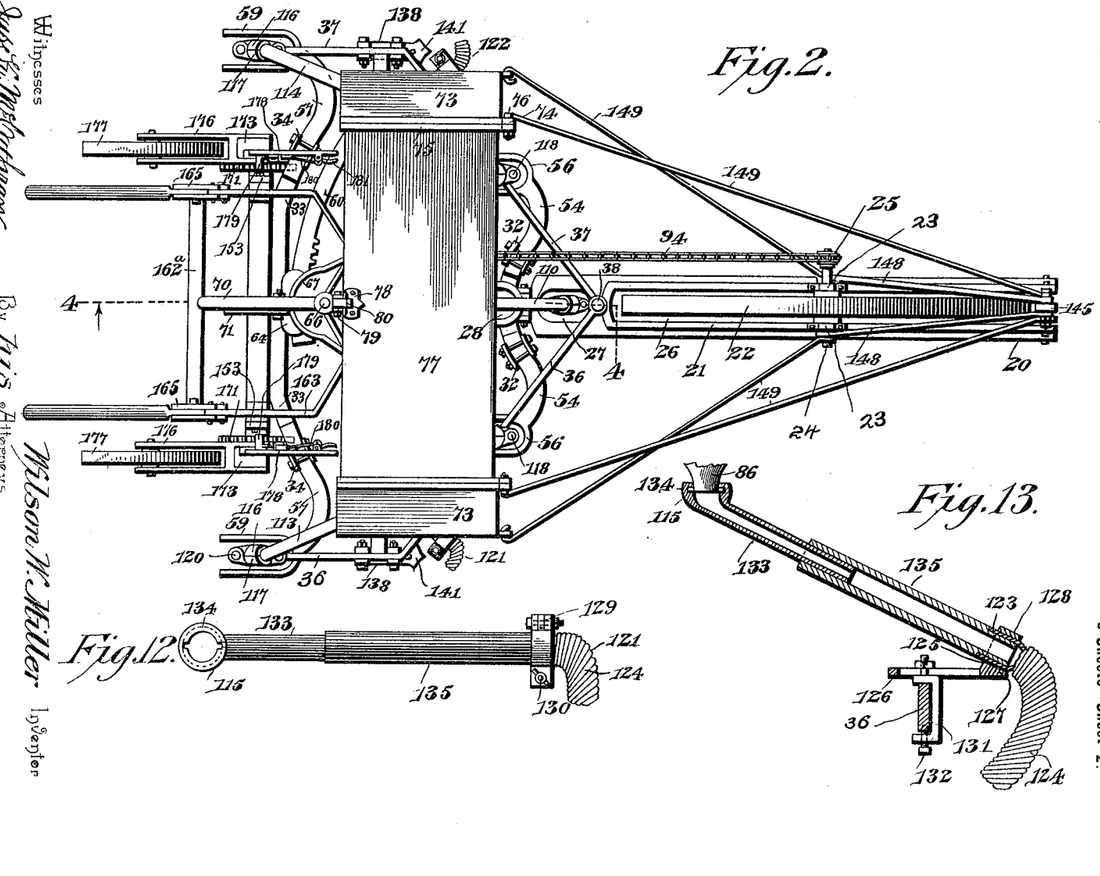
Fig. 2 is a top plan view thereof.
Fig. 12 is a detail plan view of one of the conducting-tubes for broadcast sowing.
Fig. 13 is a longitudinal vertical sectional view of the construction shown in Fig. 12.

As the drill-hoes are carried by adjustable side members of the hoe-frame and as it is necessary to secure uninterrupted communication between the drill-hoes and their seed-cups under all adjustments of the side members and the drill-hoes thereon, I attach each conveying-tube 111 to 114, inclusive, to the seed-cup by a swiveled connection and confine or clamp the outer end of each conveying-tube in proper relation to the drill-hoe. The inner upper end of each conveying-tube is provided with a flared mouth 115, (see Fig. 13,) which is flanged internally and has interlocking connection with the flanged nozzle 86 of the seed-cup 84 in a manner to prevent accidental disconnection of the conveying-tube from the cup and permit the conveying-tube to turn a limited distance on the cup for the purpose of adjusting itself to accommodate the lateral adjustment of the drill-hoe with the side member of the hoe-frame. The connection between the outer end of the conveying-tube to the side member of the hoe-frame is effected by a clamp, which is constructed in two parts 116 117. (See Fig. 11.) This bisected clamp is arranged to embrace the outer end of the conveying-tube, and it is attached to one side member of the hoe-frame in a position directly over the hoe-drill to which the conveying-tube is adapted to deliver the grain. The bisected clamp has its two members supported on the hoe-frame member by a common pivotal bolt 118, and the free ends of the members are flanged and fashioned to overlap one another at 119 for the purpose of receiving a single fastening-bolt 120, which is equipped with a binding-nut. The clamp may have its members separated by releasing the binding-nut, and thus permit the conveying-tube to be disconnected from the hoe-frame member to which the drill-hoe is attached; but normally this clamp serves to confine the outer end of the conveying-tube in a position to remain connected to the hoe-frame member and to deliver the grain which is supplied thereto from the seed-cup into the upper end of the drill-hoe. I employ a similar clamp to attach the tube 110 to the hoe-frame 21 for delivering the grain to the central drill-hoe 43.

The broadcast-sowing devices, located, respectively, at the points designated by the numbers 121 122, constitute one of the important improvements in my grain-drill, because they are adapted to distribute or sow the grain directly over and upon the corn rows. These devices are located on opposite sides of the drill-frame, and they are arranged on the side members 36 37 of the hoe-frame in the intervals between the intermediate and rear drill-hoes 44 45 and 46 47. The broadcast-sowing devices are thus adapted to distribute the grain in the spaces of the field which are not accessible to the drill-hoes, and the grain distributed by the sowers is covered up by suitable covering-shovels, which are situated in rear of and contiguous to the broadcast-sowing devices. Each broadcast-sowing device consists in part of a length of flexible tubing or hose 123, which is reinforced and strengthened by wrapping or coiling the same with a metallic jacket 124, of wire. This jacket serves to stiffen and strengthen the length of flexible tubing or hose 123, which is designed to hang loose from the side member of the hoe-frame in order to sway or swing when the machine is in motion and throw the grain freely over the corn row, and said unconfined freely-movable broadcast sower is supported on the side member of the hoe-frame and is connected with one of the seed-cups $d$ or $e$ to partake of the adjustment of the hoe-frame member without breaking the communication between the seed-cup and the broadcast sower. The pliable and freely-movable jacketed length of the sower is fitted at or near one end in a seat 125 of a supporting-plate 126, which rests upon one of the hoe-frame members 36 or 37, and one end of this supporting-plate is enlarged or widened at 127 to receive the clamping-plate 128. This clamping-plate is hinged or pivoted at 129 to the enlarged end 127 of the supporting-plate 126, and the free end of said foot-clamping plate is confined in place by a bolt 130, (see Fig. 6,) whereby the clamping-plate is adapted to bear upon a part of the broadcast-sower tube 123 in order to make the plates 126 and 128 confine the broadcast sower firmly in place on a member of the hoe-frame. The supporting device for the broadcast sower is attached to the hoe-frame member by a clasp 131, which is fast with the supporting-plate 126 and is arranged to embrace the adjustable side members of the hoe-frame, and this clasp 131 is equipped with a binding-screw 132, that impinges against the side member of the hoe-frame upon which it is fitted. The flexible broadcast-sowing tube is connected by a telescopic tube 135 to one or the other of the seed-cups $d$ or $e$ of the series of cups 84, and, as shown by the drawings, this telescopic tube consists of the members 133 135, which are slidably fitted together. The member 133 of the telescopic tube is flared and flanged at 134 to connect with the nozzle at the lower end of the seed-cup $d$ or $e$, thus making a swivel connection between the telescopic tube and the seed-cup. By slidably fitting the members 133 135 of the telescopic tube the member 135 is adapted to slide over the member 133 when the side member of the hoe-frame is adjusted.

In rear of the broadcast-sowing devices are arranged the covering-shovels 142, which are adapted to stir the soil of the corn rows and throw the soil over the grain which is distributed broadcast upon the corn rows. These shovels are carried by standards 136 137, each of which is enlarged at its upper end to form the head 138, that is bolted firmly at 139 to a side member of the hoe-frame. Each shovel-standard is slotted at 140 to receive an adjustable shovel 141, which has a bolt 142, that makes the shovel fast with the standard, whereby each shovel may be raised or lowered on said standard to regulate the penetration of said shovel.

The upper and lower frames 20 21 are coupled together by a stay-bar 145, which occupies a vertical position at the front end of the machine, and the hoe-frame 21 is connected pivotally at 146 to the stay-bar, while the carrying-frame 20 is pivotally attached at 147 to said stay-bar. A stay strut or brace 148 is attached to the hoe-frame 21, and the upper ends of the stay-bar and stay-rods 149 are fastened at their rear ends to the hopper and at their front ends to the stay-bar 145 and the hoe-frame, respectively.

The carrying-frame 20 is provided at its rear end with a transverse bar 150, (see Fig. 7,) that serves to support the lifting-frame and the adjusting-levers which carry the casters that support the rear end of the carrying-frame. This transverse bar 150 extends at right angles to the length of the frame 20, and it is applied to the under side or lower face of the flanges 35 of said frame 20. The transverse bar is bolted firmly at 151 to the flanges of the carrying-frame, and at its ends said bar is formed or provided with the depending vertical arms 152. Journal-boxes 153 are attached to bar 150, which is fixed to the main carrying-frame 20, and in these journal-boxes are loosely fitted the journals 155 of a lever or lifting frame 154. This lever or lifting frame is adapted to occupy a horizontal position in order that it may rest upon the carrying-frame 20 below the hoe-frame 21, and the lifting-frame is provided within its journals 155 with the upwardly-extending arms 156, the outer faces of which are grooved at 157 to receive the operating-handles 158. These handles are constructed and proportioned to fit snugly in the grooved arms of the lifting-frame, and said handles are, furthermore, slotted at 159 to permit the bolts 160 to pass through the slots and through the arms 156 of the lifting-frame. The handles are thus attached firmly to the lifting-frame, and they are adapted to be adjusted on the arms 156 thereof for the purpose of raising or lowering the handles to suit the convenience of the operator. The lifting-frame 154 is overlapped by a lifting-lever 161, the front end of which is fulcrumed at 162 on the carrier-frame 20, and this lifting-lever extends across the lifting-frame 154 and is adapted to have its rear end impinge or bear against the under side of the hoe-frame 21. It will be observed that the lifting-frame is fulcrumed on the transverse bar of the carrying-frame and that the lifting-lever 161 is also fulcrumed on the carrying-frame in a position to be raised by the lifting-frame 154 and to engage with the hoe-frame 21, whereby compound leverage may be exerted against the hoe-frame for the operator to adjust the hoe-frame without undue effort. The lifting-frame may readily be raised or lowered by pressing downward or upward on the handles 158, and these handles are braced and stayed by a connecting-bar 162ª, which is attached to said handles 158.

Figures 1, 15:
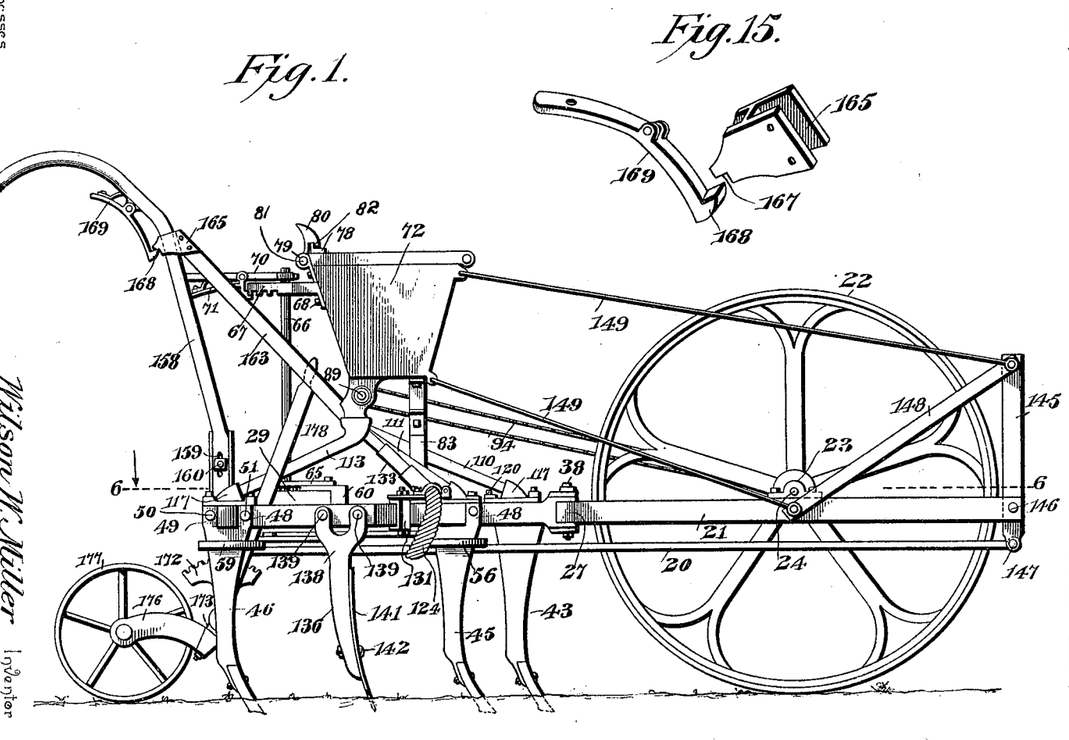
Figure 1 is a side elevation of a grain-drill constructed in accordance with the present invention.
Fig. 15 is a detail view of the detent device for connecting one of the handle-bars and the adjusting-handle for the lever-frame, by which the hoe-carrying frame may be raised out of the ground.
Figures 3, 5, 8, 9, 21:
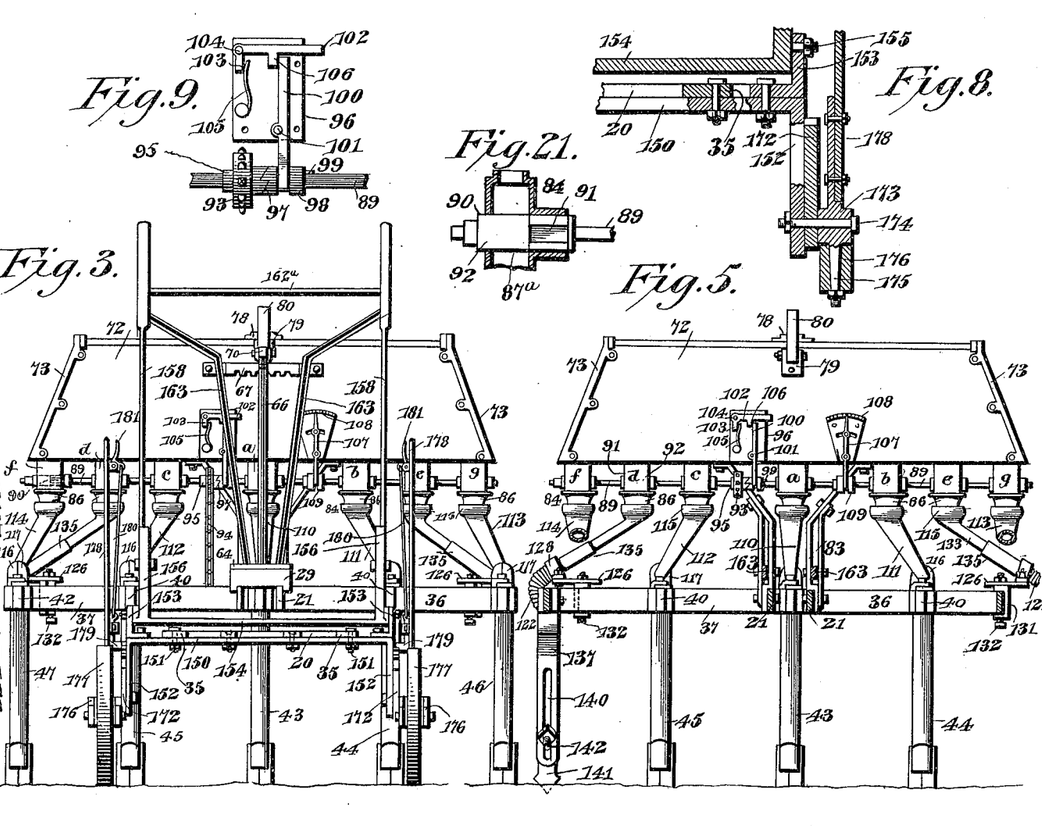
Fig. 3 is a rear elevation.
Fig. 5 is a vertical transverse section on a plane in rear of the hopper and indicated by the dotted line 5 5 of Fig. 4, looking in the direction indicated by the arrow.
Fig. 8 is a detail vertical transverse section through the rear end of the main carrying-frame.
Fig. 9 is an enlarged sectional view of the means for throwing the seed-cup shaft out of gear.
Fig. 21 is a detail sectional view showing the mounting of the seed-wheel in the seed-cup with which it is associated.

The grain-drill is guided by an operator walking in rear thereof and grasping the handle-bars 158, and to the handle-bars 158 are adapted to be connected detachably the brace-bars 163, which extend forward beneath the hopper in the inclined positions shown by Figs. 1 and 3. The front ends of the brace-bars 163 are pivotally and adjustably fastened at 164 to the standards 83, which support the grain-hopper on the hoe-frame. When the handle-bars 158 for the lifting-frame 154 are in their normal upright positions, they are confined in place by clasps 165, secured firmly to the brace-bars 163. These clasps are bifurcated at their rear ends to receive the handles 158 and enable the latter to readily enter the clasps, and these clasps are notched at 167 to receive the noses 168 of the spring-pressed catches 169, which are pivoted on the handles 158. The catches engage with the notched clasps when the handles 158 are raised in the clasps in order to hold the handles and the lever-frame properly connected to the brace-bars 163, thus providing a rigid detachable coupling between the lever-frame on the rear end of the carrying-frame and the brace-bars, which are attached to the standards that support the hopper firmly on the hoe-frame; but it will be understood that the catches may be operated to disconnect the handle-bars 158 from the brace-bars when it is desired to operate the lifting-frame 154 and the lifting-lever 161 for the purpose of raising the hoe-frame, the hoe-tubes thereon, the covering-shovels, and the hopper. When the catches 169 are released from the clasps 165 on the brace-bars, the last-named bars are free to move on the pivots 164 and the clasps 165 may slide downward on the handle-bars 158; but this adjustment does not interfere with the operation of the handle-bars 158 to move the lever-frame as may be required. The operation of raising the hoe-frame adjusts the hoe or drill tubes vertically with respect to the main carrying-frame, and the hoe-tubes may thus be raised out of the ground, which is desirable, particularly when the machine is to be cleaned from accumulations of trash around the hoe-tubes, without requiring the operator to stoop down and kick the trash out with the foot. As the cleaner-slides are supported by the carrying-frame in a stationary position as respects any vertical movement thereon, the elevation of the hoe-frame and the tubes thereon causes the tubes to travel within the slides, which have their forked ends arranged to embrace the hoe-tubes, whereby the latter may be scraped free from accumulations of soil, and thereby cleaned.

In order to regulate the height of the carrying-frame above the ground, and thereby vary the depth of penetration of the drill-hoes, I provide means on the carrying-frame which support the rear end of said frame and secure a vertical adjustment therefor. To the depending arms 152 of the transverse bar 150 at the rear end of the carrying-frame 20 are firmly secured the segments 170, which are notched at 171, and these segments are provided with depending arms 172. The fixed segments at the rear end of the carrying-frame support the caster-adjusters 173, one of which is pivoted at 174 on the arm of each segment 170. Each adjuster is provided with a spindle 175, which loosely receives the hanger 176, that supports the trailing wheel or caster 177, and to the other upper end of the adjuster 173 is firmly secured an upright lever 178. This lever 178 carries a spring-controlled latch-bolt 179, which is arranged to engage with the notched edge of the segment 170, and said latch-bolt is controlled by a handpiece 181, which is pivoted on the lever and is connected operatively with the latch-bolt by a rod 180. It will be observed that the carrying-frame has its transverse bar 150 equipped at its ends with the spaced casters 177, which serve to support the carrying-frame in a proper horizontal position transversely to the length of the machine, and each caster is supported by an adjuster, which is pivoted on a part of the carrying-frame for swinging movement thereon to vary the position of the caster relatively to the frame 20. By shifting the levers 178 in one direction the casters may be raised to lower the drill; but a reverse adjustment of the levers depresses the casters and raises the carrying-frame. The levers are adjustable independently and are locked firmly in their proper positions, and provision is thus made for the elevation or lowering of the carrying-frame to regulate the penetration of the hoe-tubes.

It will be understood that the vertical adjustment of the carrying-frame, the vertical adjustment of the hoe-frame relatively to the carrying-frame, and the lateral or horizontal adjustment of the members 36 37 of the hoe-frame, which carry the intermediate and rear hoe-tubes, may all be effected independently of each other, and provision is thus made in the machine for the several adjustments which are necessary to meet the demands of practical service of the drill. The force-feed mechanism, together with the hoes, is carried on a single frame, and said force-feed mechanism may readily be thrown into or out of service, as desired.

Figures 17, 20:
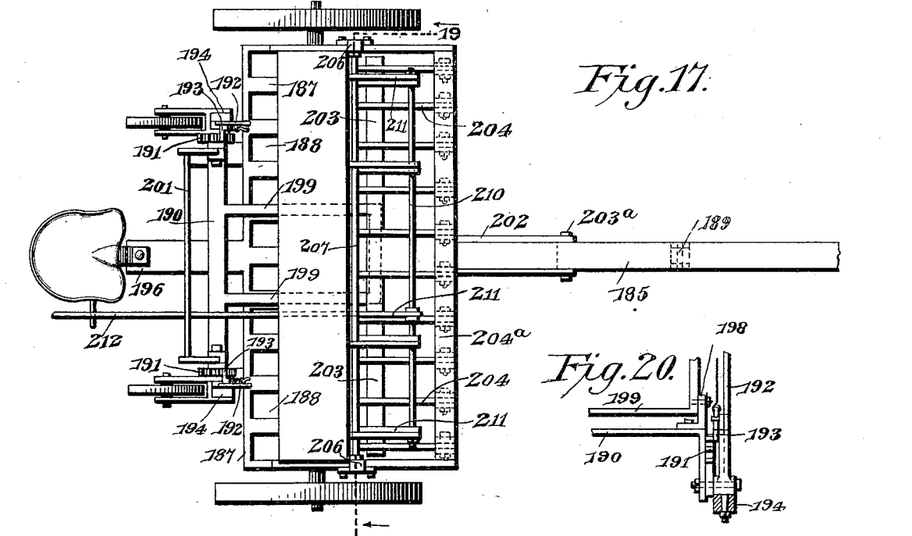
Fig. 17 is a plan view of an ordinary grain-drill, say of ten-hoe capacity, having certain of my improvements embraced therein.
Fig. 20 is a detail fragmentary rear elevation of a part of the clearer-frame and the lever-frame, showing the segmental rack and one adjusting-lever for use in the construction of the drill illustrated by Figs. 17 to 19, inclusive.
Figure 18:
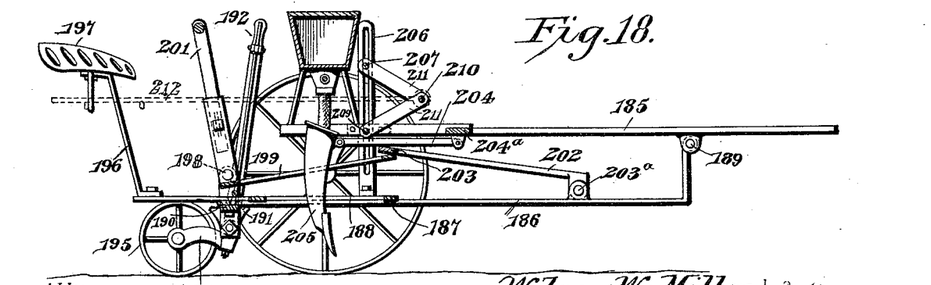
Fig. 18 is a longitudinal sectional elevation of the machine shown by Fig. 17, with the drill-hoes in their raised positions.
Figure 19:
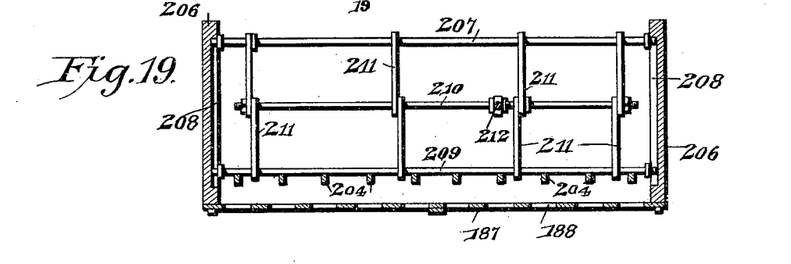
Fig. 19 is a vertical transverse sectional elevation on the line 19 19 of Fig. 17 of a part of the drill, showing the means for locking the drill hoes or tubes and their drag-bars in their lowered position.

In the embodiment of the invention represented by Figs. 17, 18, and 19 I have illustrated a grain-drill of large capacity adapted to carry a gang of drill hoes or tubes, (ten or more in number,) and this gang of hoe-tubes is carried by devices ordinary in the art adapted to loosely suspend said tubes to permit a forward and backward swinging adjustment thereof. With the gang of hoe-tubes I have associated my adjusting mechanism, which is adapted for raising and lowering the frame which carries the hoe-tubes; but the carrying-frame, which sustains the cleaner devices, is designed to remain stationary with respect to the tongue and the hoe-frame, although said carrying-frame may be adjusted vertically through the medium of the levers and the casters to vary the elevation of the carrying-frame above the ground-line. The draft-tongue 185 extends lengthwise of the machine, and below it is arranged the frame 186, which corresponds to the carrying-frame 20 of the machine shown by Figs. 1 to 5, inclusive. The front end of the frame 186 carries the transverse cleaner-frame 187, which is formed with slots or openings 188, adapted to receive the gang of hoe-tubes, and the front end of this frame 186 is pivotally connected by the bolt 189 to the under side of the draft-tongue. The rear end of the frame 186 has the transverse bar 190, which is firmly attached to said frame and is provided with depending arms that support the segments 191 in fixed position, and these segments have the arms on which the levers 192 are fulcrumed, said levers carrying the latches 193, adapted for engagement with the segment. The levers control the hangers 194, which carry the casters 195, and all of these parts are similar in construction to the devices in the drill represented by Figs. 1 to 5, except that they are made somewhat heavier and stronger to withstand the weight of a drill of large capacity. The drill of Figs. 17 and 18 has seat-bars 196 fastened firmly to the transverse bar of the lower frame, and these bars 196 support the driver's seat 197. The transverse bar 190 is, furthermore, equipped with the journal-bearings 198 for the lifting-frame 199, that is arranged to lie upon the frame 186, and is provided with arms, to which are secured the bail-shaped frame 201. On the frame 186 is fulcrumed at 203 the lifting-lever 202, which is arranged to extend rearwardly across the lifting-frame 199, and the free end of this lifting-lever is provided with a transverse bar 203, which is adapted to bear against the under side of the drag-bars 204, which carry the gang of hoes 205, adapted to fit loosely in the slotted frame 187. The drag-bars 204 are pivoted to the hoe-frame 204$^a$, to which the tongue is connected. To this slotted frame 187 is firmly secured the posts or uprights 206, which are joined at their upper ends by a cross-bar 207, and these uprights or posts are provided in their opposing faces with guide grooves or ways 208. A pressure-rod 209 has its ends fitted slidably in the guideways of the posts, and this rod is arranged to exert pressure on the hoe-frame for the purpose of keeping the latter in a depressed condition and to prevent the hoe-tubes from rising out of the ground. The rod 209 is controlled by an actuating-rod 210, which has linked connections 211 with the cross-rod 207 and the pressure-bar 209, and to this actuating-rod 210 is connected a shifting-rod 212, which extends rearwardly within reach of the driver occupying the seat 197.

Changes may be made in the form and proportion of some of the parts while their essential features are retained and the spirit of the invention embodied. Hence I do not desire to be limited to the precise form of all the parts as shown, reserving the right to vary therefrom.

It will be understood that nearly all the parts of my grain-drill are made of metal, either of malleable iron or cast-steel, for which purpose the parts are skeletonized to reduce the weight without sacrificing strength, but the materials employed are not essential.

It will be noted that in both types of my drill the hoe-tubes may be raised with relation to the main carrying-frame, so as to facilitate the operation of cleaning the trash which accumulates around the hoe-tubes, and this cleaning operation may be effected simply by raising the hoe-tubes, the trash being caught and detained by the cleaner-frame or the slides thereon. Provision is made for regulating the depth of penetration of the drill-tubes, and consequently the depth the grain is drilled in the ground, by adjusting the caster-wheels of the main or carrying frame.

The present application discloses and contains claims covering the same relative mounting and adjustment of the main wheel-frame and the clearer-frame and also other features of construction which are disclosed in my companion application, Serial No. 707,393, filed originally May 14, 1898, and in these particulars is a divisional application of said companion application, Serial No. 707,393.

Having thus described the invention, what I claim is—

1. In a grain-drill, the combination with a hoe-frame carrying a gang of hoe-tubes, and a frame provided with cleaner devices, of means for adjusting the hoe-frame and the tubes thereon with relation to the other frame and its scrapers or cleaners, substantially as described.

2. In a grain-drill, the combination with a carrying-frame having cleaner devices, and a hoe-frame supporting a gang of hoe-tubes, of lever lifting mechanism substantially such as described, to exert compound leverage on the hoe-frame for adjusting the latter and its gang of hoe-tubes with relation to the carrying-frame, substantially as described.

3. In a grain-drill, the combination with a carrying-frame having cleaner devices, and a hoe-frame supporting a gang of hoe-tubes, of a lifting mechanism comprising a lifting-frame fulcrumed on the carrying-frame, and a lifting-lever also fulcrumed on the carrying-frame and engaging with the lifting-frame and the hoe-frame, substantially as described.

4. In a grain-drill, the combination with a carrying-frame having cleaner devices, and a hoe-frame supporting a gang of hoe-tubes, of a lifting-frame fulcrumed on the carrying-frame and arranged to rest thereon, a lifting-lever fulcrumed on the carrying-frame and arranged to span the lifting-frame for its free end to bear against the hoe-frame, and handles rigid with the lifting-frame, substantially as described.

5. In a grain-drill, a lifting-frame provided with offstanding arms adjacent to its pivotal connection with a carrying-frame, and handles fastened firmly to said offstanding arms and connected thereby rigidly with the lifting-frame, in combination with a carrying-frame on which the lifting-frame is pivoted, and a hoe-frame arranged above the lifting-frame to be adjusted vertically thereby, substantially as described.

6. In a grain-drill, the combination with a hoe-frame, of a carrying-frame arranged to support the hoe-frame, and means for supporting and adjusting the carrying-frame vertically, substantially as described.

7. In a grain-drill, the combination with a hoe-frame carrying a gang of hoe-tubes, of a wheeled carrying-frame having means for adjusting the same vertically, and an independent adjusting contrivance for moving the hoe-frame vertically with respect to the carrying-frame, substantially as described.

8. In a grain-drill, the combination of a carrying-frame, the caster-adjusters attached pivotally to the rear end of the carrying-frame, wheeled hangers swiveled on the caster-adjusters, levers for shifting the position of the adjusters and provided with locking devices, a hoe-frame carrying a gang of hoe-tubes, and means for adjusting the hoe-frame relatively to the carrying-frame and independently of the vertical adjustment of said carrying-frame by the adjuster-levers, substantially as described.

9. In a grain-drill, a carrying-frame provided at its rear end with the transverse, fixed bar, segments fast with said bar, pivoted adjusters supported by the bar and having the wheeled hangers connected thereto, and levers fast with said adjusters and provided with locking devices to engage the segments, in combination with a hoe-frame carrying a gang of hoes and means for adjusting the hoe-frame relatively to the carrying-frame, substantially as described.

10. In a grain-drill, the carrying-frame provided at its rear end with the armed transverse bar, a lifting-frame pivotally supported above said transverse bar and provided with the operating-handles, and a lifting-lever which extends across the lifting-frame, in combination with a hoe-frame arranged above the carrying-frame for the lifting-lever to engage therewith, a gang of hoe-tubes on said hoe-frame, and cleaner devices on the carrying-frame, substantially as described.

11. In a grain-drill, the combination of a clearer-frame having the carrying-wheels, a wheeled main frame which carries the shovels and is pivoted to the clearer-frame at or near the front end thereof, and means for adjusting the main frame and its shovels vertically with relation to the clearer-frame, substantially as described.

12. In a grain-drill, the combination with a main frame supported at one end from the ground and equipped with drills at its opposite end portion, of a clearer-frame having pivotal connection with the supported end of the main frame and supported at its opposite end from the ground and in turn supporting the movable end portion of the main frame, and means interposed between the supported end of the clearer-frame and the free end of the machine-frame for raising and lowering the latter, substantially as and for the purposes described.

13. In a grain-drill, the combination with a main frame supported at its front end from the ground and provided with drills at its rear end, of a clearer-frame having pivotal connection with the front end of the main frame and supported at its rear end from the ground and extending beneath the main frame to form a support therefor, and a lever-frame fulcrumed upon the clearer-frame and adapted to have its horizontal portion engage with said main frame for effecting a vertical movement thereof, substantially as and for the purposes described.

14. In a grain-drill, the combination with a main frame supported from the ground at its front end, of a clearer-frame having pivotal connection at its front end with the forward end of the main frame, ground-wheels supporting the rear end of the clearer-frame, drills carried by the main frame, and a lever-frame mounted at the rear of the clearer-frame and adapted to engage with the main frame to raise and lower the latter and the drills thereon, substantially as described.

15. In a grain-drill, the combination with a carrying-frame, of adjustable side bars having the hoe-tubes, a hopper, seed-tubes adapted to discharge to the hoe-tubes, adjustable arms mounted on said carrying-frame, and broadcast seed-sowers confined on the frame by said adjustable arms, substantially as described.

16. In a grain-drill, the combination with a frame, a hopper and a seeding mechanism, of a flexible broadcast seed-sower, a slotted arm having said flexible sower confined or held thereon, and means for firmly holding the slotted arm in variable positions on the frame, substantially as described.

17. In a grain-drill, the combination of a horizontal frame supported at its rear end by ground-wheels, a main frame having pivotal connection with the front end of said horizontal frame and carrying the seed-dropping mechanism, laterally-adjustable bars mounted on said main frame and provided with drills and shovels, and grain-tubes arranged to deliver to the drills and to sow the grain broadcast in advance of the shovels, substantially as described.

18. In a grain-drill, the combination with a hopper and a gang of hoe-tubes arranged to be supplied from said hopper, of broadcast sowers connected with the hopper and arranged to distribute grain in the intervals between said gang of hoe-tubes, substantially as described.

19. In a grain-drill, the combination with a frame, and a hopper, of a gang of distributing and drilling devices arranged in staggered relation, broadcast sowers situated between certain of the drilling devices to distribute grain in the intervals between the latter, and means for supplying grain from the hopper to the drilling devices and the broadcast sowers, substantially as described.

20. In a grain-drill, the combination with a frame and a gang of staggered drill-hoes communicating with a hopper, of freely-movable broadcast sowers supported on the frame between the drill-hoes and having operative connections with the hopper, for the purpose described, substantially as set forth.

21. In a grain-drill, the combination with a frame, a hopper, and a gang of staggered drill-hoes communicating with the hopper, of broadcast sowers supported on opposite sides of the frame in the intervals between certain of the drill-hoes and adapted to sway or play freely on the frame, and conveying-tubes between the broadcast sowers and the hopper, substantially as described.

22. In a grain-drill, the combination with a hopper and a gang of drill-hoes, of broadcast sowers communicating with the hopper and adapted to distribute grain freely over corn-rows, and covering-shovels situated in rear of the broadcast sowers, substantially as described.

23. In a grain-drill, the combination with a frame, a hopper and a gang of drill-hoes, of broadcast sowers clamped to said frame and having freely-movable lengths which are suspended from the frame, means connecting said broadcast sowers with the hopper, and covering-shovels supported on the frame and arranged to travel in rear of the broadcast sowers, substantially as described.

24. In a grain-drill, a broadcast sower consisting of a length of flexible tubing reinforced by a metallic jacket, a supporting-plate in which said tube is confined, and means for clamping the supporting-plate on a frame, in combination with a hopper, a gang of drill-hoes, and conveying-tubes leading from the hopper to the drill-hoes and the broadcast sower, substantially as described.

25. In a grain-drill, the combination with a hopper, and a frame having laterally-adjustable members, of a gang of drill-hoes carried by said adjustable members of the frame, broadcast sowers supported on said adjustable frame members, and conveying-tubes substantially such as described, connected with the hopper, the gang of drill-hoes and the broadcast sowers to permit the hoes and sowers to be adjusted with the frame members without interrupting the communication thereof with the hopper, substantially as described.

26. In a grain-drill, the combination with a hopper and a frame having laterally-adjustable members, of a gang of drill-hoes carried by said adjustable members of the frame, and connected individually with the hopper, a broadcast sower fitted to each of the adjustable frame members independently of the drill-hoes, and telescopic conducting-tubes connecting said sowers with the hopper, substantially as described.

27. In a grain-drill, the combination with a wheeled carrying-frame having means for raising and lowering the same, a hoe-frame carrying a hopper and a gang of drilling and distributing devices which are mounted on said hoe-frame to be adjusted at variable distances from the median line of the frame, means for adjusting the hoe-frame relatively to the carrying-frame and independently of the vertical adjustments of said carrying-frame, and an adjusting contrivance supported by the hoe-frame for shifting the position of the drilling and sowing devices independently of the vertical adjustments of the carrying-frame or the hoe-frame, substantially as described.

28. In a grain-drill, a bisected clamp having its members pivoted at one end and detachably confined at their overlapping ends, in combination with a hoe-frame carrying a drill-hoe, a hopper, and a conveying-tube connected at one end with the hopper and having its other end confined detachably on the hoe-frame by the bisected clamp, substantially as described.

29. In a grain-drill, the combination with a hopper having a series of seed-cups, a force-feed shaft, and a driving device, of a driven pinion mounted loosely on the shaft and engaging with the driving device, a shiftable clutch splined on the shaft for engaging with the driven pinion, a shipping-lever engaging with said clutch, and a spring-pressed locking-lever arranged to engage with the shipping-lever and holding the clutch in engagement with the driving-pinion, substantially as described.

30. In a grain-drill, the combination with handle-bars and a lifting-frame having the upwardly-extended handles, of a clasp attached to the handle-bars to receive the handles, and a latch mounted on the handles for engagement with the clasp, substantially as described.

31. In a grain-drill, the combination with handle-bars and a lifting-frame having the upwardly-extending handles, of the forked clasps fast with the handle-bars and arranged to embrace the handles of said lifting-frame, and latches pivoted to the handles and engaging with the clasps to confine the handles therein, substantially as described.

In testimony that I claim the foregoing as my own I have hereto affixed my signature in the presence of two witnesses.

WILSON W. MILLER.

Witnesses:
E. W. MILLER,
U. R. MILLER.